United States Patent [19]
Green et al.

[11] Patent Number: 5,081,677
[45] Date of Patent: Jan. 14, 1992

[54] CRYPOTOGRAPHIC KEY VERSION CONTROL FACILITY

[75] Inventors: Lucina L. Green, Verbank; Michael J. Kelly, Poughkeepsie; Ronald M. Smith, Wappingers Falls; Julian Thomas; Phil C. Yeh, both of Poughkeepsie, all of N.Y.

[73] Assignee: International Business Machines Corp., Armonk, N.Y.

[21] Appl. No.: 576,562

[22] Filed: Aug. 31, 1990

[51] Int. Cl.$^5$ ............................................... H04L 9/02
[52] U.S. Cl. ......................................... 380/21; 380/44
[58] Field of Search ...................................... 380/21, 44

[56] References Cited
U.S. PATENT DOCUMENTS
4,972,472  11/1990  Brown et al. .................... 380/21

*Primary Examiner*—Stephen C. Buczinski
*Attorney, Agent, or Firm*—William B. Porter

[57] ABSTRACT

A facility for making dynamic changes to a system master key without stopping the system, and without loss of integrity to ongoing cryptographic operations. A version number is generated and associated with the current master key. A dynamic change is made to the master key, resulting in the then current master key becoming the old master key, and a "new" current master key (with a new version number) being placed into operation. Subsequent cryptographic requests using a supplied key enciphered under the old master key are identified by means of a supplied version number associated with the supplied key. This identification triggers a reencipher operation, reenciphering the supplied key under the now current master key—after which the cryptographic operation proceeds. Unique patterns are generated to verify the contents of the master key registers, and to authorize normal use of the cryptographic facility, and issuers of key-change operations.

10 Claims, 10 Drawing Sheets

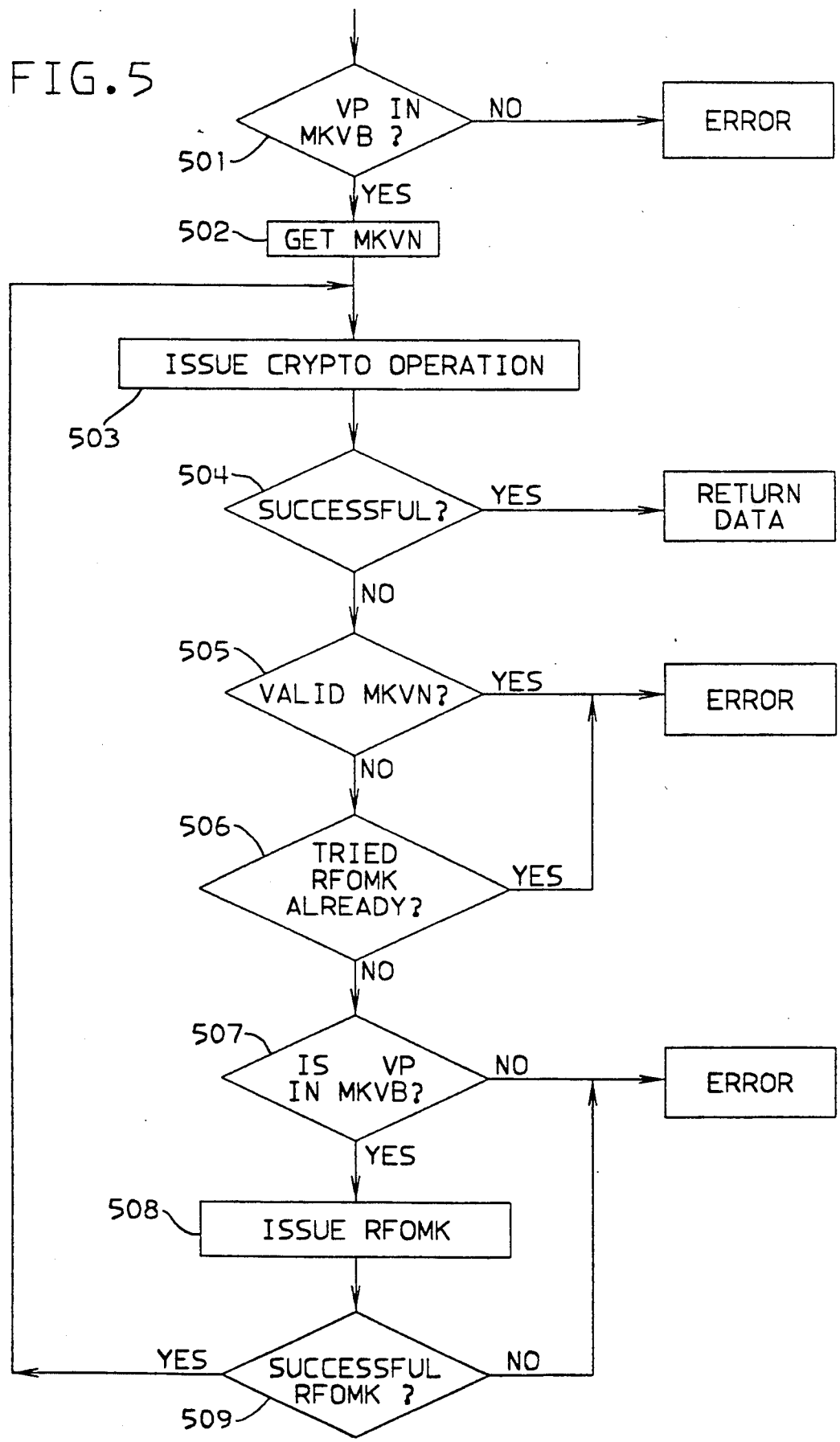

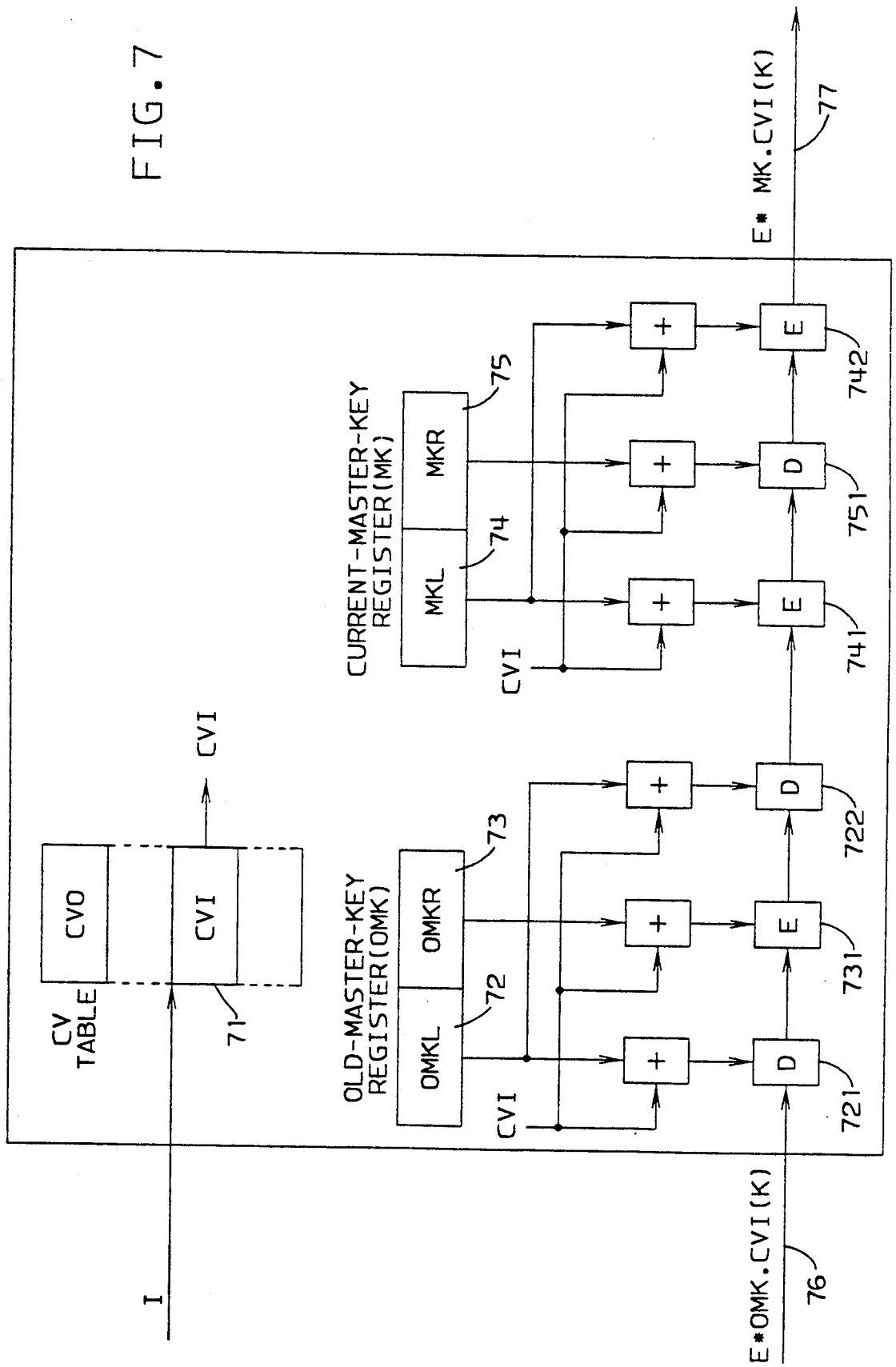

CRYPTOGRAPHIC KEY VERSION CONTROL FACILITY

BACKGROUND OF THE INVENTION

1. Field of the Invention

This invention relates to the use of cryptography within general purpose computers. More particularly, this invention relates to techniques for changing master keys which are used to encipher other keys using a data encryption algorithm.

2. Background Art

With the increasing number of computer end users, sharing of common system resources such as files, programs and hardware and the increasing use of distributed systems and telecommunications, larger and more complex computer base information systems are being created. In such systems, an increasing amount of sensitive data may be transmitted across unsecured communication lines. Because of the insecurity of communication lines, there is an increasing concern over the interception or alteration of sensitive data which must pass outside a controlled or protected environment or which may become accessible if maintained for too long a period of time. Cryptography has been recognized as an effective data security measure in that it protects the data itself rather than the medium over which it is transmitted or the media on which it is stored.

Cryptography deals with methods by which message data called cleartext or plaintext is encrypted or enciphered into unintelligible data called ciphertext and by which the ciphertext is decrypted or deciphered back into the plaintext. The encipherment/decipherment transformations are carried out by a cipher function or algorithm controlled in accordance with a cryptographic or cipher key. The cipher key selects one out of many possible relationships between the plaintext and the ciphertext. Various algorithms have been developed in the prior art for improving data security in data processing systems. Examples of such algorithms are described in U.S. Pat. No. 3,796,830 issued Mar. 12, 1974 and U.S. Pat. No. 3,798,359 issued Mar. 19, 1974. Another more recent algorithm providing data security in data processing systems is described in U.S. Pat. No. 3,958,081 issued May 18, 1976. This algorithm was adopted by the National Bureau of Standards as a data encryption standard (DES) algorithm and is described in the Federal Information Processing Standards publication, Jan. 15, 1977, FIPS PUB 46.

In a secure cryptographic system it is essential that no key appear in the clear outside the secure facility. Normally, it is impractical to keep all keys inside the secure facility. Rather, these keys are encrypted under a master key; then, only the master key need be maintained within the secure facility. In such a system there is a requirement to periodically change the master key without significant interruption to normal operation.

The action involved in changing the master key consists of several steps. The collection of these steps is called the conversion process. That moment in the conversion process at which the new master key becomes active is called the switchover.

As part of the conversion process, those keys which have been encrypted under the previous master key must be converted to be encrypted under the new master key. This conversion requires that both master keys be available inside the secure facility at the same time. Part of this conversion may occur before the switchover, and part after the switchover. Before the switchover, the two master keys involved are called the current-master key and the new-master key. After the switchover, they are called the old-master key and current-master key, respectively.

Since the time to reencipher keys is significant, it is desirable to perform as much of the conversion as possible in advance of the switchover. The majority of the keys to be converted in systems such as IBM's MVS/SP reside in a special data set, called the cryptographic key data set (CKDS). The keys on the CKDS can be reenciphered to a new version of the CKDS as a batch operation before the master key is changed. However, not all keys are kept in the CKDS and some application programs may have old copies of CKDS entries. There is no easy way to locate these keys and they must be converted after the switchover.

A "control vector" technique exists for controlling the usage of cryptographic keys. It is described in U.S. Pat. No. 4,924,514 by S. M. Matyas, et al., issued May 8, 1990; U.S. Pat. No. 4,924,515 by S. M. Matyas, et al., issued May 8, 1990; U.S. Pat. No. 4,918,728 by D. Abraham, et al., issued Apr. 17, 1990 and U.S. Pat. No. 4,941,176 by S. M. Matyas, et al., all assigned to the assignee of the present invention. These patents are incorporated herein by reference.

SUMMARY OF THE INVENTION

This invention provides a means to ensure that programs using a cryptographic facility which utilizes a master key are coordinated with the master key installed in the facility, while nevertheless permitting the master key to be changed without halting system operation.

In operation, the changes consists of the following steps:

1. A value for the new master key is first entered into the secure facility. This entry is normally done by means of several parts, which are Exclusive ORed inside the secure facility. Since each part may be entered by a different individual, no one person knows the key.

2. After all the parts of the new master key have been entered and combined, the control program obtains, and saves for future use, the authorization pattern and the verification pattern for the new master key. The authorization pattern is used like a password, and as such, must be safeguarded. The verification pattern is used like a name and need not be kept secret. Both of these patterns are derived from the new master key by means of "one-way functions". The main difference in the two patterns is in their use not in their derivation.

3. The control program performs the batch key conversion. All entries in the current CKDS are converted. The results of this conversion are placed in a new CKDS.

4. The switchover occurs. This is accomplished when the control program places the new master key into operation. This causes the contents of the current-master key register to be copied into the old-master key register, the contents of the new-master key register to be copied into the current-master key register, and then the contents of the new-master key register to be cleared. The master key version number register is also updated by this instruction.

Normally, the control program would increment the master key version number by one.

5. The remaining keys are converted upon first use after switchover.

An application program requesting that a key be generated is passed back a key token comprising the generated key enciphered under a master key, and the verification pattern associated with the enciphering master key. When subsequently making a request for a cryptographic operation of the cryptographic facility, the application passes the key token to be used, which is used to derive the version number of the master key under which the key is enciphered. The crypto facility compares the version number of the current master key to that of the request and, in the event of an unequal condition, generates an exception.

The occurrence of the exception signals the cryptographic support program that the key has not been converted. The support program can then convert the key, use it, and return it to the application for future use. The support program can then re-execute the original instruction, but this time with the current version number and using the properly enciphered key. This allows the system master key to be changed without exposing the master key value to applications, and without disrupting active cryptographic functions.

It is thus an object of this invention to provide for improved, nondisruptive, master key changes.

It is a further object of this invention to provide for improved integrity during master key changes.

It is still a further object of this invention is to provide a mechanism to restrict use of certain functions of the system's cryptographic facility.

BRIEF DESCRIPTION OF THE DRAWINGS

FIG. 5 is a flowchart illustrating control flow for an application requesting a cryptographic function after the master key has changed.

FIG. 7 is a block diagram showing the Reencipher from Old Master Key (RFOMK) instruction.

DESCRIPTION OF THE PREFERRED EMBODIMENT

Figure 1:
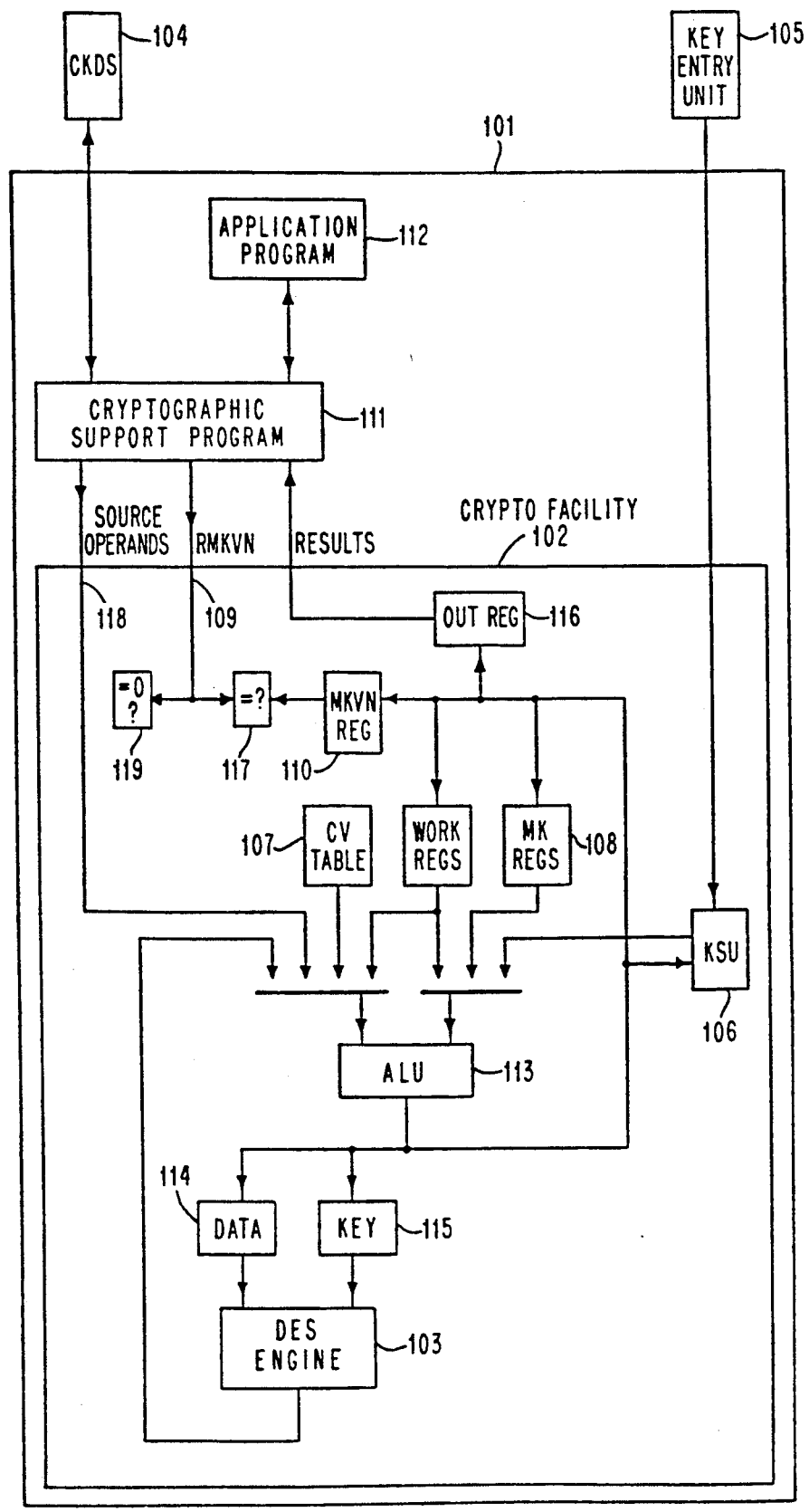
FIG. 1 is a system diagram showing the interrelation among the Cryptographic Facility, the Cryptographic Support Program, the Crypto Key Data Set (CKDS), and an application program.

FIG. 1 shows an environment within which the present invention operates. System 101 contains a cryptographic facility 102 for securely performing cryptographic operations such as enciphering and deciphering data, using an engine 103 implementing a cryptographic transformation algorithm such as the NBS DES algorithm (described in the Federal Information Processing Standards publication, January 15, 1977, FIPS Pub. 46). In addition to a DES engine, the crypto facility contains an arithmetic and logical unit 113 which is used to perform the necessary data movement and logical operations required to perform the various functions provided by the crypto facility. The ALU serves as the central data flow control in the crypto facility. Information flow in the crypto facility is accomplished by gating the information into the ALU and then the output of the ALU can then be gated to any of the registers in the crypto facility. The cryptographic algorithm uses a secret key to control its operation. Encipher and decipher operations are accomplished by passing the appropriate information through the ALU to the Data 114 and Key 115 register inputs to the DES engine. The results of the DES engine are then routed through the ALU and gated into the appropriate crypto facility register. The keys used in data encryption are kept on a Crypto Key Data Set (CKDS) 104 in enciphered form. The keys on this data set are themselves enciphered under a System Master Key (MK) which is entered by means of a key entry unit 105 into the secure cryptographic facility 102 through a Key Storage Unit 106. Since the preferred embodiment makes use of the aforementioned control vector technique for key separation, a control vector table 107 contains required control vectors which are Exclusive-ORed with a master key, and used by the DES engine 103. For reasons that will become apparent, a newly entered MK is held temporarily in a New Master Key (NMK) register in the master key array 108 until it is placed into operation in an operational master key register in the same area, using the Set Master Key (SMK) instruction described below. At this time (called "cutover", or "switchover"), the then operational MK is moved into an Old Master Key (OMK) register in the key register area 108. A Version Number is supplied and stored in a version number register 100, associated with the current master key. As part of the execution of a normal crypto operation, the reference master key version number 109 is passed, along with the source operands 118, to the crypto facility. The RMKVN is also compared with the master key version number register 110. The comparison is done in the master key version number comparison circuit 117. The RMKVN is compared with zero. This comparison is done in the zero-test circuit 119. Normal crypto operations are rejected if the RMKVN is zero or if it does not match the MKVN Register.

The results of a crypto operation are returned by gating the information through the ALU to the Output Register 116. Required control vectors 107 are Exclusive-ORed with the master key array 108 in the arithmetic and logical unit 113.

A Cryptographic Support Program 111 manages the Cryptographic Facility, 102, and also manages the CKDS 104. It also provides an interface between application programs 112 wishing to obtain cryptographic support, and the Cryptographic Facility 102.

Figure 8:
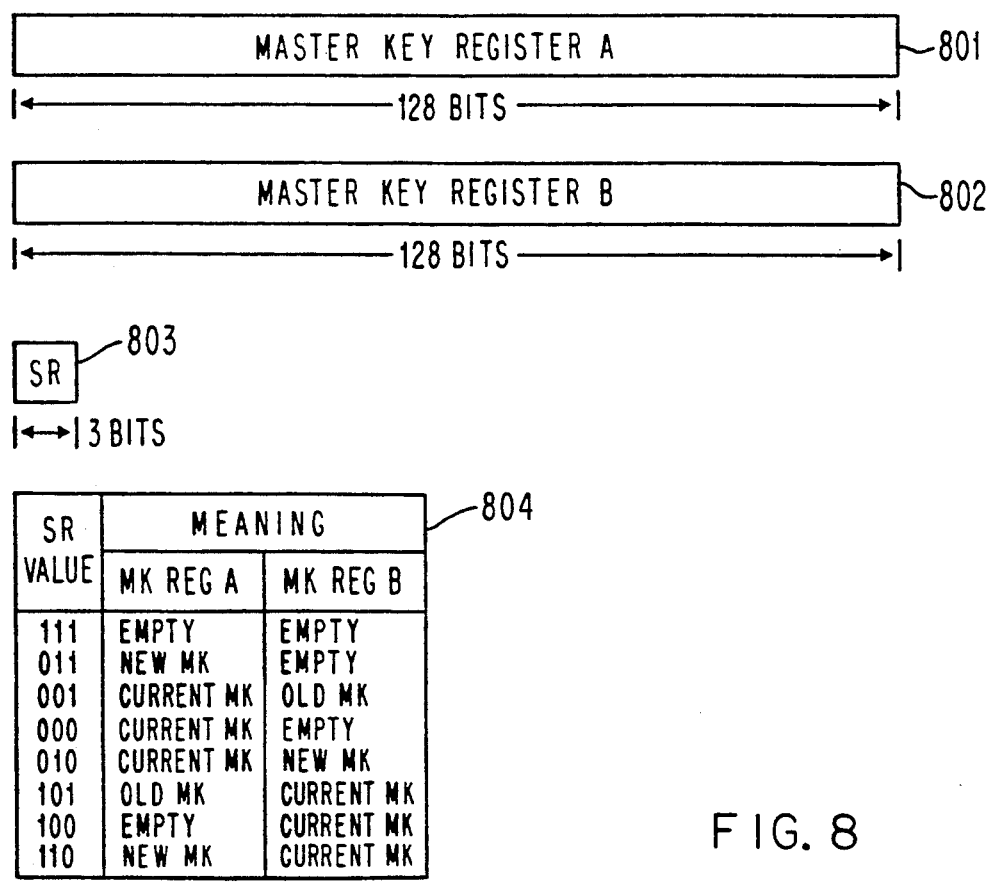
FIG. 8 is a block diagram of the master key array showing two Master Key Registers, a State Register, and the possible register states.

A preferred embodiment for the master key array 108 is illustrated in FIG. 8. The MK Registers consist of two 128-bit registers (801 and 802) for containing two master keys and a 3-bit state register (803) which indicates the current state of the two MK registers. Although many other implementations are possible, in the implementation shown here, switchover is accomplished without requiring any movement of information in the two master key registers. Rather, this is accomplished by changing the value of the 3-bit state register.

Table 804 illustrates the usage of this state register. Initially, (state 111) both registers are empty. After entry of the new master key into Register A 801, register B 802 is still empty (state 011). At initial switchover, the new master key becomes current, and the new master key register is empty (state 000). When another master key is initially entered into master key register B 802, the state is 010. Then, at the next switchover, the then current master key becomes the old master key, and the then new master key becomes current (state 101). Of course, a three register embodiment (old, new, current) is also possible.

Before an installation can change the system master key, it is first necessary to enter a new master key into the cryptographic facility, using the key entry unit 105. The newly entered master key is stored in the master key array 108.

As noted above, the authorization pattern is in the nature of a password, and must be safeguarded; the verification pattern is used like a name, and need not be kept secret. The "verification pattern" may be requested for a new master key, an operational master key, and an old master key—since it is not considered "secret", as noted before. The "authorization pattern", being secret, may only be requested for a new master key. (It is generated internally to the cryptographic element for the current master key, but is not externalized for that key.) The cryptographic support program 111 requests the generation of these values by the cryptographic facility 102.

Figure 2:
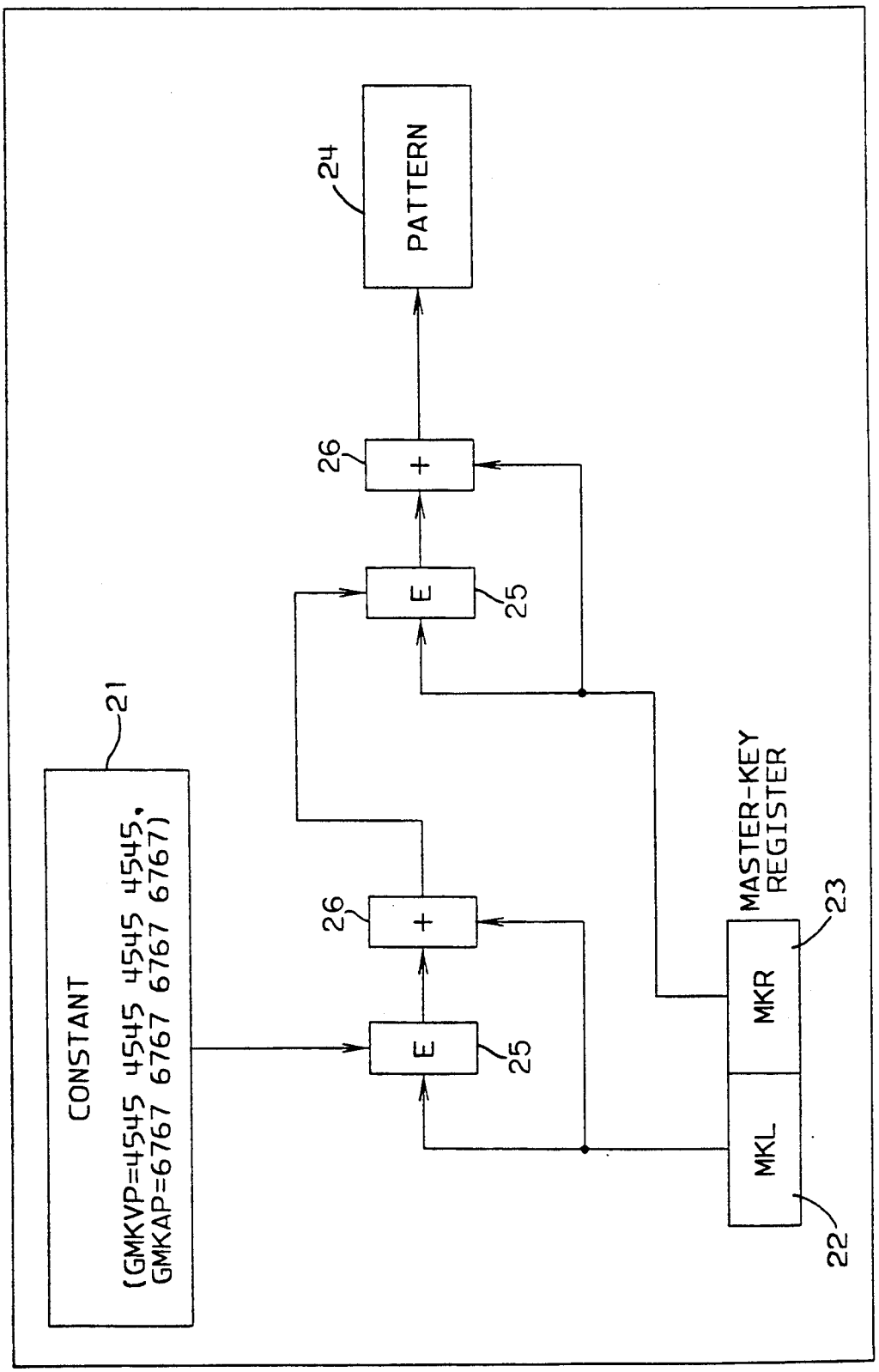
FIG. 2 is a block diagram showing the Generate Master Key Verification Pattern (GMKVP) function, and the Generate Master Key Authorization Pattern (GMKAP) function.

FIG. 2 illustrates the "generate Master Key Verification Pattern" function as well as the "Generate Master Key Authorization Pattern" function. (The "E" blocks 25 represent logical encipherment functions under the conventional DES algorithms; the "+" blocks 26 represent Exclusive-OR operations. This notation will be used in subsequent figures also.) The functions differ in the value used as constant 21, and in the authority to generate the patterns—which differs with the key for which the pattern is generated. The left portion 22 of the master key is enciphered under the constant, and that result is Exclusive-ORed with the left portion 22. This result is then used as a cryptographic key to encipher the right portion of the master key 23, and that result is Exclusive-ORed with the right portion 23. This final pattern 24 is either the verification or authorization pattern, depending on which constant value was used as the original starting point. The pattern is returned as the result operand of the instruction and kept in the header record of the CKDS (FIG. 6C at 63A). (The header contains control information including: date of creation, time of creation; date/time of last update; sequence number (updated with each modification); MKVP; MKAP).

Figure 3:
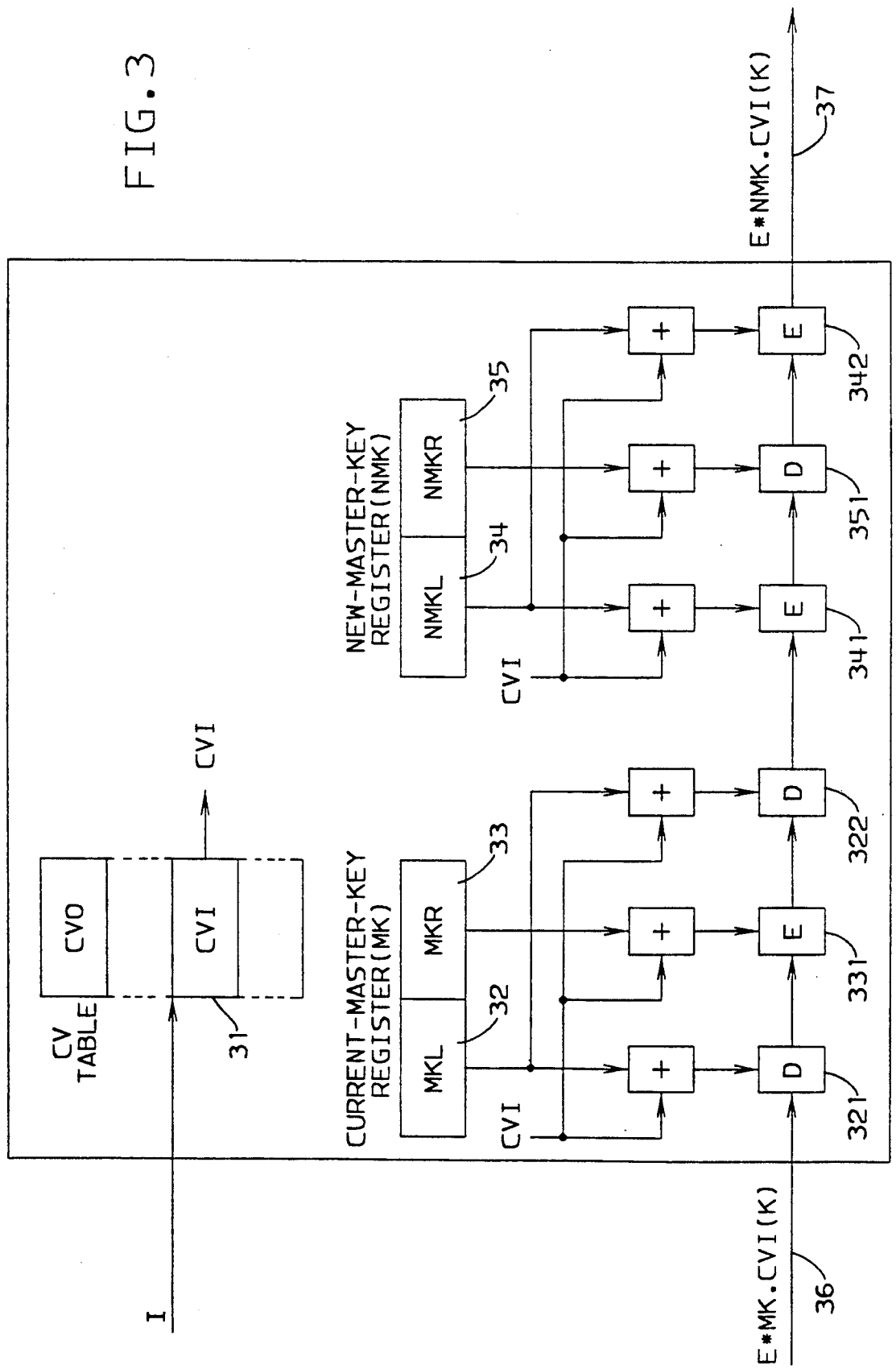
FIG. 3 is a block diagram showing the Reencipher to New Master Key (RTNMK) instruction.

When the installation has entered the New Master Key into the Cryptographic Facility, it is then necessary to reencipher the keys on the CKDS from under the current master key, to under the new master key. To accomplish this, the Cryptographic Support Program reads the keys in the CKDS into storage and issues a "Reencipher to New Master Key" (RTNMK) instruction to the Cryptographic Facility to securely reencipher the key. The operation of this instruction is illustrated in FIG. 3.

Figure 6A:
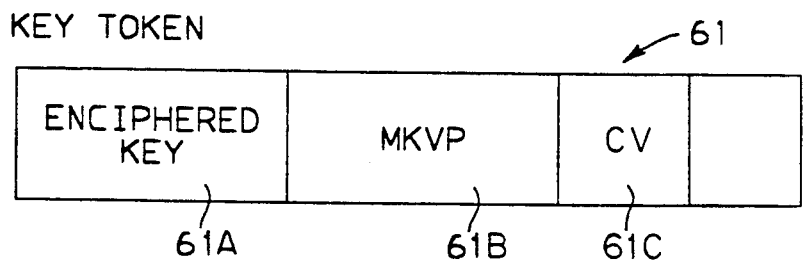
FIGS. 6A-C are control block diagrams showing the format of the Key Token, the MKVB, and the CKDS.

The appropriate control vector value $CV_i$ is selected 31 by using an index (i) supplied as an operand of the instruction (derived from the control vector itself which is part of the key token, FIG. 6A at 61C) to select a control vector value $CV_i$ from a read only table inside the cryptographic facility. Then the left portion of the current (operational) master key is Exclusive ORed with the control vector, and used to decipher the input key 36 (enciphered under the current (operational) master key Exclusive-ORed with the control vector) 321. The resulting value is then enciphered 331 (using the right portion of the current master key, and the control vector), then again deciphered 322 (using the left current master key and control vector). This intermediate value is then successively enciphered 341, deciphered 351, and enciphered 342, using the left, right, then left portions of the new master key, respectively (and control vector). The resultant value 37 is the input key, now enciphered under the new master key (Exclusive-ORed with the appropriate control vector).

After all the keys in the CKDS have been converted, the new version of the CKDS is written to DASD along with the saved VP and AP. When the Cryptographic Support Program is requested to place the new master key into operation it (A) reads the new CKDS into storage (verifying that keys on it are enciphered under the new master key by comparing the AP saved with the CKDS, with the AP for the new master key (Generated again), then (B) issues the "Set Master Key" (SMK) instruction to the Cryptographic Facility, passing it the authentication pattern for the new master key, as well as a new master key version number.

As part of power-on reset, and at IPL, the MKVN in the crypto facility is set to zero. Since normal crypto instructions are rejected when the RMKVN is zero, normal crypto operations cannot be used until the MKVN register is set to a nonzero value. FIG. 4B shows the execution of the Set MKVN Register (SMR) instruction. First, 410, the Cryptographic Facility generates an authentication pattern for the current master key stored in the master key array 108 (following the logic of FIG. 2) and compares this value 411 to the supplied value. A comparison is made 412. If the values do not match, an exception is indicated 413. If the values match, the supplied version number is placed 414 into the MKVN within the Cryptographic Facility. Since Set MKVN Register will not complete successfully unless the master key authorization pattern is matched, the program cannot use the crypto facility unless it knows the master key authorization pattern. Subsequent SMK's will increment the version number by one.

Figure 4A:
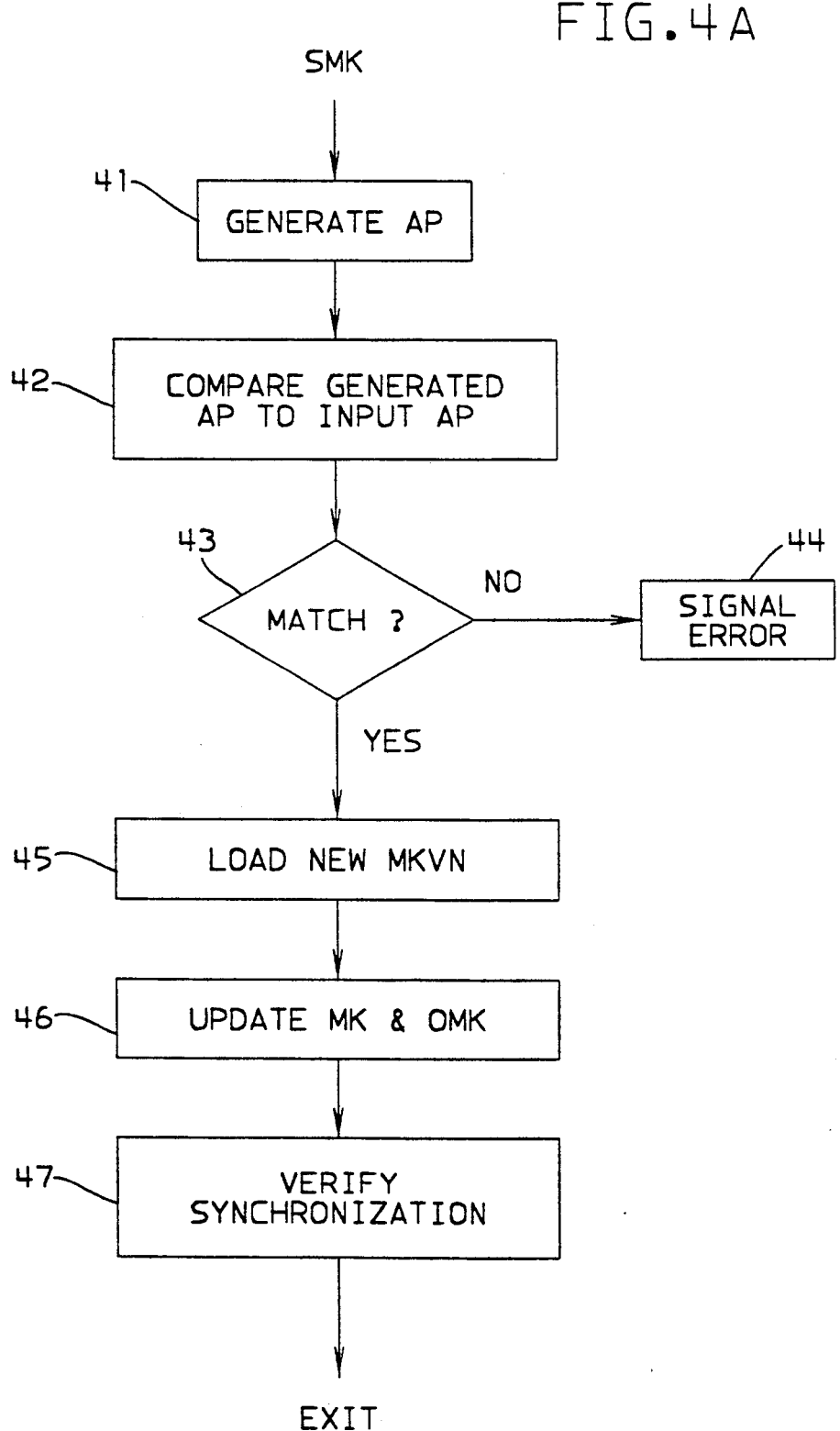
FIG. 4A is a flowchart illustrating Set Master Key Processing.
Figure 4B:
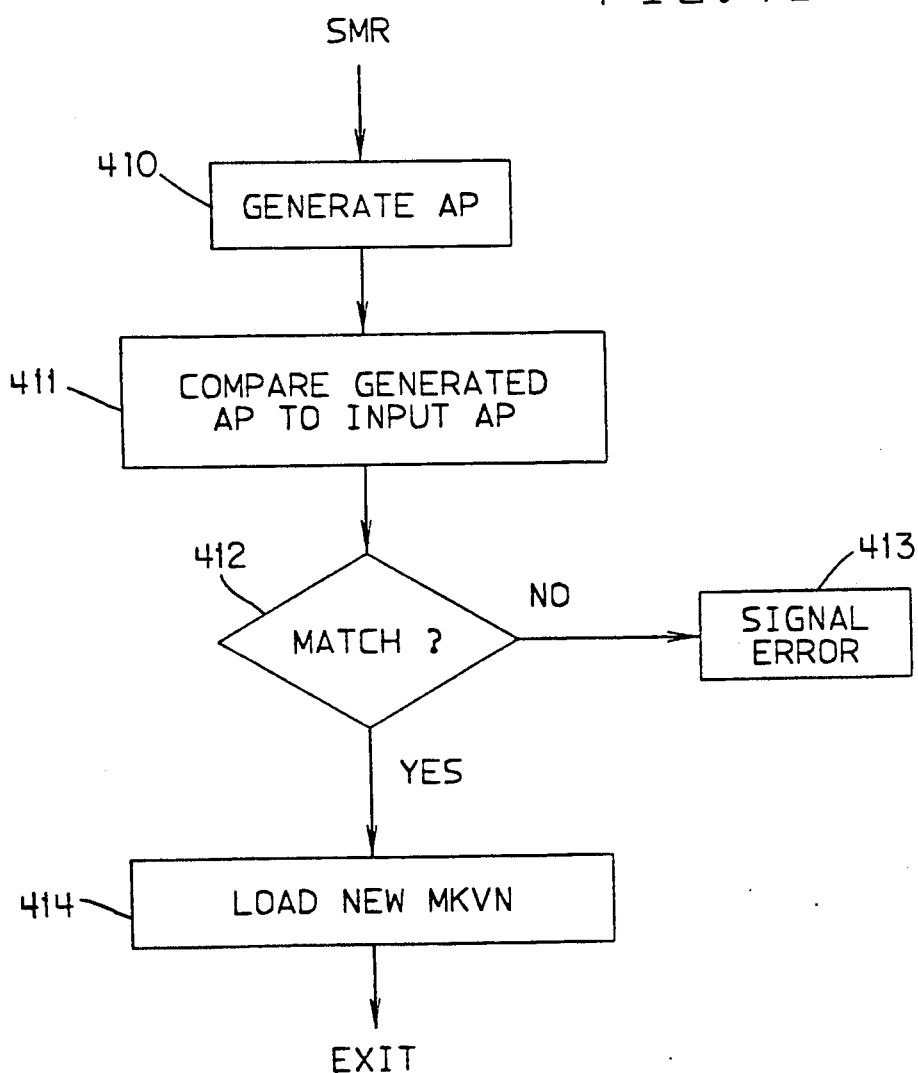
FIG. 4B is a flowchart illustrating Set Master Key Version Number Processing.

FIG. 4A illustrates SMK processing. First, 41, the Cryptographic Facility generates an authentication pattern for the new master key stored in the master key array 108 (following the logic indicated in FIG. 2), and compares this value 42 to the supplied value. A comparison test is made 43. If the values do not match, an exception is indicated (44). If the values match, the supplied version number is placed 45 into the MKVN within the Cryptographic facility (FIG. 1 at 104). Then 46 the new master key is placed into the operational master key location (as indicated by state register 803) and the former operational master key is placed into the old master key location.

The Cryptographic Support Program stores the entries for the "new current" master key in the MKVB (62A,62B), and makes the "old current" master key entries the entries for the old master key (62C,62D). Finally, the CKDS pointers (comprising an ALET for the data space in which the CKDS is held, and an address of the base of the CKDS in that space are switched so that the current CKDS will be used in the future.

All the processing described above, to place the new master key into operation, is serialized by the cryptographic support program (using a cross-memory lock, for example, in MVS). The switch of the CKDS pointers is serialized with the execution of the SMK instruction (and the check of its successful completion) by a CPU locked unit of work.

Figure 6B:
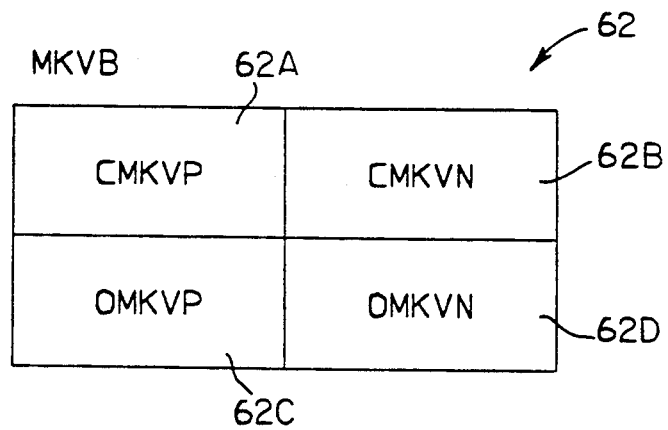
Figure 6C:
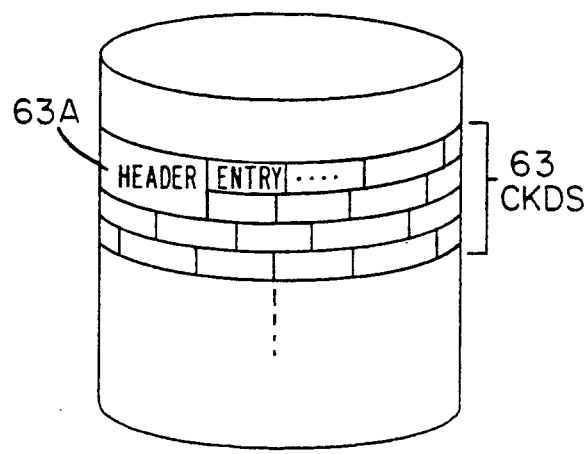
Figure 9A:
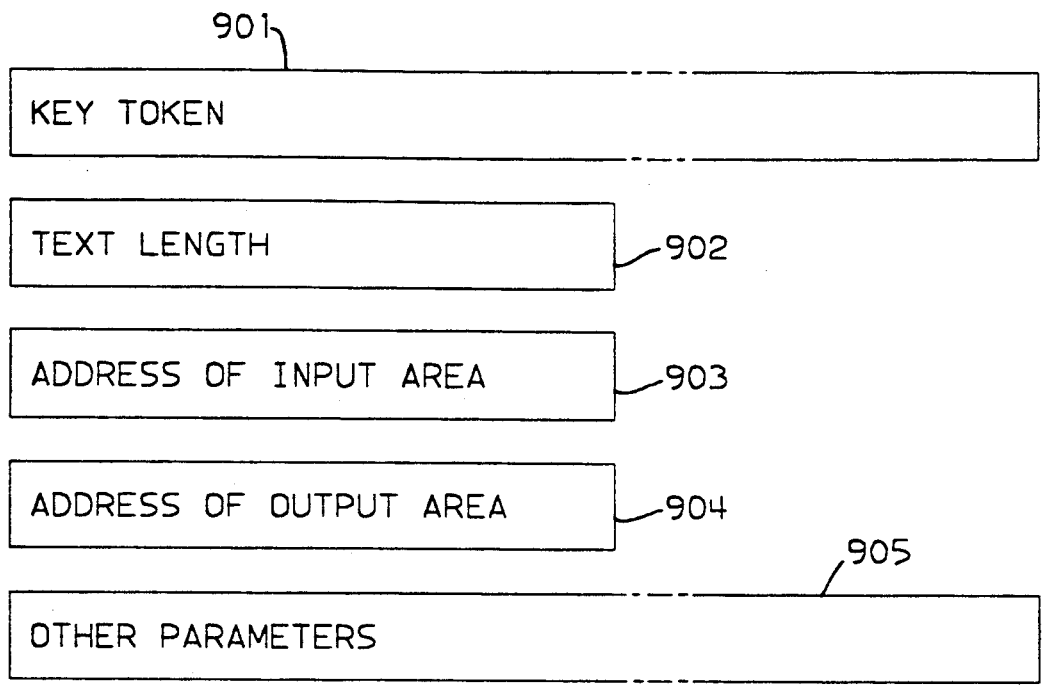
FIG. 9A is a schematic showing the general format of a typical application crypto request instruction.
Figure 9B:
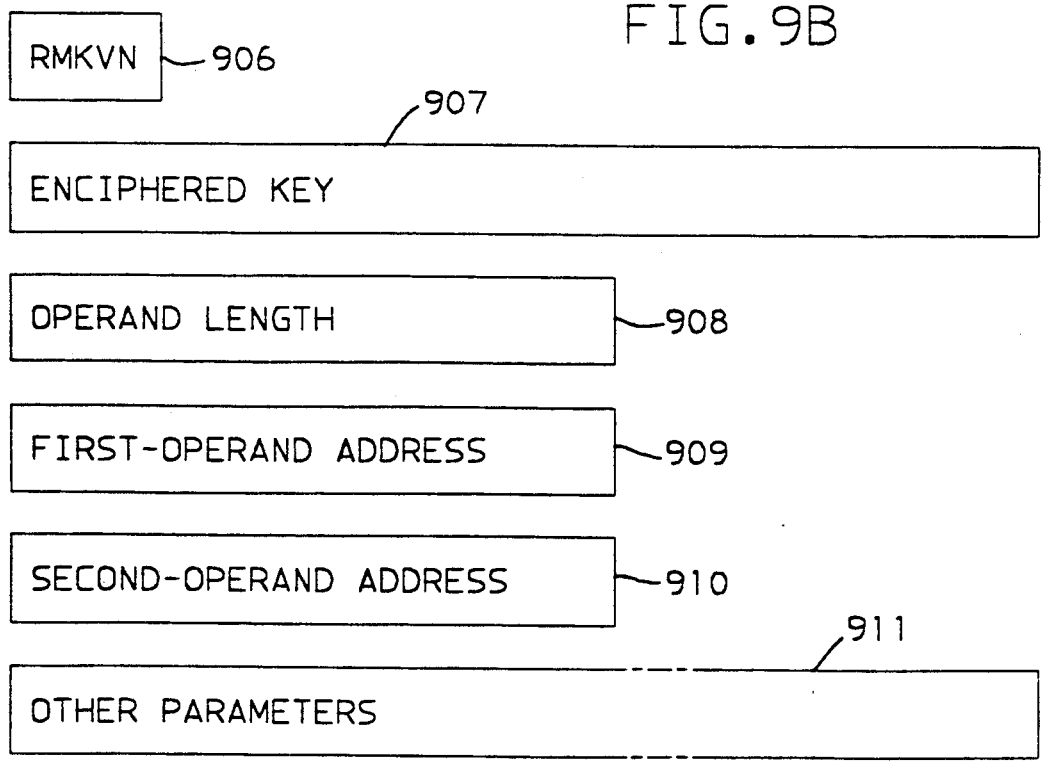
FIG. 9B is a schematic showing the general format of the request instruction after processing by the cryptographic support program.

An application program that had started using cryptographic functions before a master key change will be using cryptographic keys enciphered under the wrong (old) master key, after a "switchover". FIG. 9A shows the format of a typical request from an application program. It comprises key token 901 (see FIG. 6A), the text length 902, address of the input area 903, address of the output area 904, and other parameters 905 relevant to particular functions but not to the present invention. The cryptographic support program converts this to the form used by the cryptographic facility, which is shown in FIG. 9B. It comprises the version number 906, the enciphered key 907, operand length 908, first operand address 909, second operand address 920, and other incidental parameters 911. As part of this conversion, the MKVP from the Key Token (FIG. 6A) is compared with the CMKVP and OMKVP in the MKVB (FIG. 6B). If the MKVP in the key token matches the CMKVP, then the enciphered key in the key token can be used as is. If the MKVP in the key token does not match the CMKVP but does match the OMKVP, then the enciphered key must be converted by use of the RFOMK instruction. Normally, when the master key has been updated, this will be discovered at this point in the processing. However, there is a possibility that the master key will be updated after this test and the time at which the actual cryptographic instruction is issued. This can be the case when the cryptographic instruction is very long running, or a page fault occurs during the execution of the cryptographic instruction, or the task is interrupted and swapped out between the time that the instruction parameters are set up and the time that the instruction is executed. FIG. 5 illustrates control flow within the cryptographic support program to deal with this case. (The application program supplies a "key token" along with the enciphered key and other parameters (function indicator; input data; etc.)—see FIG. 6 at 61.

At 501, a test is made whether the Verification Pattern (VP) supplied in the key token for the request (FIG. 6 at 63), is in a table maintained by the cryptographic support program called the Master Key VP Block (see FIG. 6 at 64). If not, (e.g., if an application held a key through two change master key cycles and then attempted to use it) an error indication is returned to the application. If the VP is in the MKVB, then the associated MKVN is retrieved 502 (CMKVN 66 if the VP was for the current (operational) master key, OMKVN 68 if it was for the old master key). The cryptographic request instruction is issued 503, passing the VN to the crypto facility. The crypto facility executes the cryptographic operation (returning an "unsuccessful" indication if the supplied VN does not match the VN associated with the operational master key). The crypto support program tests for successful execution of the cryptographic request at 504, and returns the resulting data to the application if the instruction was successful. If not, a test is made 505 whether the VN was valid (current) (by testing a unique response code). If so, the crypto facility's error was for another reason, and an error indication is returned to the application. If the VN was not for the current master key, a check is made 506 whether an RFOMK was already tried. If so, an error indication is returned. If not, a check is made 507 that the VP associated with this VN is in the MKVB. If not, (e.g., if the master key changed since the test at 501) an error return is made to the application (with a reason code). If the VP is in the MKVB (OMKVP—FIG. 6B at 62C), the "Reencipher From Old Master Key (RFOMK) instruction is issued 508, supplying the OMKVP and the enciphered key to the crypto facility. (See below for details of RFOMK). If RFOMK executed successfully 509, the key will now be enciphered under the current master key, and a new key token consisting of the current master key VP (obtained from the MKVB at 62A) and the newly enciphered key (from the RFOMK results) is now supplied with the cryptographic request at 503. An indication is returned to the application that a rebuilt token (containing a newly enciphered key and VP) is being returned, for use in subsequent operations.

FIG. 7 illustrates the logic for the Reencipher From Old Master Key (RFOMK) instruction. First, the appropriate control vector $CV_i$ is selected 71. Then the left portion of the old master key is Exclusive-ORed with the control vector, and used to decipher the input key 76 (enciphered under the old master key Exclusive ORed with the control vector) 721. The resulting value is then enciphered 731 (using the right portion of the old master key, and the control vector), then again deciphered 722 (using the left old master key and control vector). This intermediate value is then successively enciphered 741, deciphered 751, and enciphered 742 using the left, right, then left portions of the current master key, respectively (and control vector). The resultant value 77 is the input key, now enciphered under the current (operational) master key (Exclusive ORed with the appropriate control vector.)

Although specific embodiments of the invention have been disclosed, it will be understood by those having skill in the art that changes can be made to these specific embodiments without departing from the spirit and scope of the invention.

What is claimed is:

1. A cryptographic apparatus permitting nondisruptive, dynamic master key changes, comprising:
   a) a cryptographic engine for performing cryptographic operations on supplied data using a supplied key, said supplied key being enciphered under an enciphering master key;
   b) master key register means comprising:
      1) a first master key register for holding a first master key;
      2) a second master key register for holding a second master key;
      3) state register means having a plurality of possible values, said values identifying said first register and said second register as empty, as containing a new master key, as containing a current master key, or as containing an old master key;

c) means for ensuring that the supplied key is enciphered under the current master key.

2. The cryptographic apparatus of claim 1 in which said means for insuring that the supplied key is enciphered under the current master key comprises:

a) a master key version-number register for holding a master key version number, the master key version number being supplied and associated with the current master key when the current master key is placed in the current master key register;

b) key token means for identifying an encrypting key used to encipher the supplied key;

c) exception means for identifying a mismatch between the encrypting key used to encipher the supplied key, and the current master key;

d) verification means, responsive to said exception means, for verifying that the mismatch exists because the encrypting key, used to encipher the supplied key, is now present in the old master key register;

e) means for reenciphering the supplied key from the old master key contained in the old master key register to the current master key in the current master key register, when said verification means so verifies the mismatch.

3. The cryptographic apparatus of claim 2 in which the key token means comprises a master key verification pattern uniquely associated with an associated master key by means of a one-way function.

4. The cryptographic apparatus of claim 3 in which the verification means comprises a Master Key Verification Block (MKVB) having a current master key entry and an old master key entry.

5. The cryptographic apparatus of claim 4 in which the current master key entry comprises the master key version number associated with the current master key and the master key verification pattern associated with the current master key, and in which the old master key entry comprises the master key version number associated with the old master key, and the master key verification pattern associated with the old master key.

6. The cryptographic apparatus of claim 5 further comprising verification pattern means for securely verifying that keys in a Cryptographic Key Data Set (CKDS) are enciphered under either the old master key, the current master key, or the new master key.

7. The cryptographic apparatus of claim 2 further comprising means for reenciphering a key enciphered under the current master key to being enciphered under the new master key.

8. The cryptographic apparatus of claim 2, further comprising means for restricting the use of functions of the cryptographic apparatus to a possessor of an authorization pattern derived from an associated master key by a one-way function.

9. The cryptographic apparatus of claim 8, in which said means for restricting the use of functions comprises:

a) means for resetting to a predetermined value said master key version number register when a system containing said cryptographic apparatus is initialized or is power-on reset;

b) means for prohibiting any of said cryptographic operations, requiring the enciphering master key, from executing when said master key version number register has the predetermined value; and c) means for prohibiting said master key version number register from being set to a value other than the predetermined value by a master key version number supplier unless the master key version number supplier also supplies the authorization pattern.

10. In a data processing system, a method for making dynamic, nondisruptive changes to a current master key controlling a cryptographic apparatus comprising the steps of:

(a) associating a current version number with the current master key;

(b) replacing the current master key with a new master key having an associated new master key version number in a master key version number register, said current master key thereafter being termed an old master key and said new master key being termed thereafter the current master key, the current master key version number thereafter being termed an old master key version number, and the new master key version number being termed the current master key version number;

(c) providing, as part of a request for a cryptographic function, a supplied token uniquely associated with a supplied user key;

(d) determining a supplied version number associated with the supplied user key;

(e) comparing the supplied version number with the current version number, and signalling an exception if said comparing resulted in an unequal condition;

(f) if said comparing resulted in the exception being signalled, automatically reenciphering the supplied user key from under the old master key to under the current master key if the supplied version number matches the old master key version number;

(g) continuing with the request for the cryptographic function using the automatically reenciphered supplied user key;

(h) causing the master key version number register to be reset to a predetermined value following a system reset or an initialization (IPL) of a system containing the cryptographic apparatus;

(i) deriving an authorization pattern from the current master key by a one-way function;

(j) prohibiting any cryptographic function requiring the current master key from executing when the master key version number register has the predetermined value; and (k) requiring a master key version number reset function to supply the authorization pattern in order to successfully reset the master key version number to a value other than the predetermined value.

* * * * *

UNITED STATES PATENT AND TRADEMARK OFFICE
CERTIFICATE OF CORRECTION

PATENT NO.  :  5,081,677
DATED       :  January 14, 1992
INVENTOR(S) :  L. L. Green, et al.

It is certified that error appears in the above—identified patent and that said Letters Patent is hereby corrected as shown below:

On the title page, item (75) add the following inventors:

Randall J. Easter
    Donald B. Johnson
    Stephen M. Matyas

Signed and Sealed this

Sixth Day of July, 1993

Attest:

MICHAEL K. KIRK

*Attesting Officer*     Acting Commissioner of Patents and Trademarks